United States Patent [19]
Wiesmann

[11] Patent Number: 5,151,174
[45] Date of Patent: Sep. 29, 1992

[54] INSTALLATION FOR THE DISINFECTION OF CLARIFIED SEWAGE WITH UV APPARATUS BUILT INTO SIPHONS

[76] Inventor: Rudolf Wiesmann, Bogenackerstrasse 26, 8630, Tann, Switzerland

[21] Appl. No.: 668,964

[22] Filed: Mar. 13, 1991

[30] Foreign Application Priority Data

Mar. 13, 1990 [DE] Fed. Rep. of Germany ....... 4007898

[51] Int. Cl.⁵ .......................... A61L 9/20; F04F 10/02
[52] U.S. Cl. ...................................... 210/97; 137/143; 137/151; 137/153; 210/192, 210/248; 210/748; 250/436; 250/438; 422/186.3
[58] Field of Search ........................ 137/123, 140–142, 137/151, 153, 238, 143; 210/97, 170, 192, 248, 513, 748, 776, 232, 188; 422/24, 186.3; 250/428, 433 R, 434, 435, 436, 437, 438

[56] References Cited

U.S. PATENT DOCUMENTS

| | | | |
|---|---|---|---|
| 301,391 | 7/1884 | Reinecke | 137/142 |
| 1,196,481 | 8/1916 | Recklinghausen et al. | 250/437 |
| 3,836,781 | 9/1874 | Ellison | 250/437 |
| 4,367,410 | 1/1983 | Wood | 250/436 |
| 4,482,809 | 11/1984 | Maarschalkerweerd | 250/436 |
| 4,599,179 | 7/1986 | Pincon | 422/186.3 |
| 5,006,264 | 4/1991 | Acuna | 210/776 |

FOREIGN PATENT DOCUMENTS

| | | | |
|---|---|---|---|
| 0317735 | 9/1988 | European Pat. Off. | 210/192 |
| 2213658 | 10/1973 | Fed. Rep. of Germany | 210/192 |
| 421296 | 2/1911 | France | 210/192 |
| 425184 | 3/1911 | France | 210/192 |
| 433368 | 1/1912 | France | 210/192 |
| 62-113900 | 5/1987 | Japan | 137/123 |
| 1583394 | 1/1981 | United Kingdom | 422/24 |

Primary Examiner—Robert A. Dawson
Assistant Examiner—Joseph Drodge
Attorney, Agent, or Firm—Tarolli, Sundheim & Covell

[57] ABSTRACT

The discharge conduit by which clarified sewage is withdrawn from a sewage clarification plant comprises a headwater conduit section and a low-water conduit section, the latter being separated from the former. The two conduit sections are connected to each other by at least one overground tube, the tube being designed as a siphon. An UV irradiation apparatus is provided for disinfecting the clarified sewage. However, the UV irradiation apparatus is not arranged in the discharge conduit, but is built in into the siphon. This solution has the advantage that the UV irradiation apparatus, which is installed overground, is less susceptible to failure and can more easily be serviced.

11 Claims, 2 Drawing Sheets

INSTALLATION FOR THE DISINFECTION OF CLARIFIED SEWAGE WITH UV APPARATUS BUILT INTO SIPHONS

FIELD OF THE INVENTION

This invention refers to an installation for the disinfection of clarified sewage which is withdrawn from a sewage clarification plant by an open discharge conduit, said installation being provided with an UV irradiation apparatus for irradiating the sewage.

BACKGROUND OF THE INVENTION

The publication FR-A-425,184 describes an installation for the disinfection of water wherein UV irradiation apparatus is arranged overground in the course of a conduit connecting a high-level reservoir to a lower-level reservoir. This installation works without power consumption for feeding the water if the water flows from said high-level reservoir to said lower-level reservoir and if the fall of water is sufficient for generating the necessary water throughput in the UV irradiation apparatus. However, if the fall of water is slight, as this is generally true for conduit tubes, the water to be treated must be fed with energy consumption to a UV irradiation apparatus arranged overground.

The publication FR-A-421,296 describes an installation of the same kind wherein the water to be treated is conveyed through a conduit arranged overground and provided with a UV irradiation apparatus by the water pressure in the feeding conduit. In addition to the energy consumption which is necessary, this apparatus has the drawback that the overpressure in the conduit, in combination with the proposed replaceable UV radiator units, causes enormous sealing problems. Moreover, for replacing the UV radiator units, the installation must be shut down, i.e. the water flow must be interrupted.

Therefore, installations of this kind were developed which can be operated without additional energy consumption.

In the conventional installations of this kind, the UV irradiation apparatus is built into the waste conduit. The individual UV radiators are surrounded by radiation pervious protective tubes which are intended to prevent an access of water to said UV radiators. Usually, the installation comprises a plurality of UV radiators which are grouped, together with their individual protective tubes, so as to form modular, individually replaceable kits. These kits are arranged in the waste conduit in such a manner that the UV radiators or their protective tubes, respectively, one completely immersed in the sewage. The upper ends of said kits are provided with the electric fittings necessary for operating the UV radiators, said electric fittings being connected to an electric supply unit by means of plug-type connectors (cf. e.g. the publication EP-A2-0,317,735).

Disinfection installations of this kind have various drawbacks. In the waste conduit, supporting facilities for the UV kits must be provided comprising guides for assembling and disassembling the former. In consideration of the low sewage level, which is about half a meter below the ground level, said guides are considerably long. A further problem is that of reliably and durably sealing said supporting facilities against the conduit wall in order to prevent any sewage from flowing past the UV kits. Inundation of electric fittings having electric insulation defects, e.g. under unfavourable weather factors, and leakages of the protective tube holders may bring electric installation parts into contact with water thus resulting in operating troubles. The danger of damages is increased, if assistant staff is engaged for supervising the disinfection installation, as is usually done. A further drawback is that the protective tubes of UV kits in action can only be cleaned mechanically, which in many cases is not sufficient for removing the coating which has formed on the outer surfaces of the protective tubes. For a more efficient chemical cleaning, the UV kits must be disassembled, since otherwise the cleaning fluid could get directly into the sewage.

The publications FR-A-433,368 and DE-A-2,213,658 describe installations for the treatment of water by means of UV radiation, wherein the UV kits are arranged in containers to which the water to be treated is fed in a free flow. However, the difficulties occuring in the installation according to the publication EP-A2-0,317,735 described above, can be removed only to a small extent.

SUMMARY OF THE INVENTION

The main object of the present invention is to eliminate the drawbacks of the prior art described above, and to provide an improved disinfection installation of the general kind described above.

In order to accomplish this object, according to the present invention the waste conduit comprises a headwater conduit section and a low-water conduit section separated from the former, said two conduit sections being connected to each other by an overground tube which is designed as a siphon, the UV irradiation apparatus being mounted inside said siphon.

Said siphon, also known as bent siphon tube, is a simple device for conveying liquids. No additional energy consumption is necessary for operation of said siphon, i.e. for transferring the sewage from the headwater conduit section to the low-water conduit section. On account of the differing water levels in the two conduit sections, the sewage flows without any exterior help from the headwater conduit section to the low-water conduit section. Moreover, said siphon is self-regulating with respect to the fluid throughput. An increased fluid throughput results in a decreased level difference between the headwater and the low-water, thus lowering the flow pressure and therewith decreasing the fluid throughput, and vice versa.

A solution of this kind is known, per se, from the publication DE-B2-2,622,637 which refers to an irradiation installation comprising UV radiators located in a flow-through tube, said flow-through tube having terminal flanges comprising central feed and drain pipes, respectively. The longish UV radiators which extend in the direction of water flow are arranged in a circle around the feed and drain pipes, respectively, to which the terminal flanges bearing said protective tubes are inserted.

The installation for UV irradiation according to the present invention may comprise a plurality of UV radiators which are grouped so as to form modular, individually replaceable radiator groups. The UV radiators of each radiator group may be arranged, in a manner known per se, in a plane which is perpendicular to the direction of sewage flow. However, unlike the conventional construction, in the practical embodiment of the invention the protective tubes for housing one UV radiator each are not arranged on the replaceable radiator groups but are permanently built into the siphon.

The overground arrangment of the UV irradiation apparatus, which is not lowered into the waste conduit but to which the sewage is fed. has the advantage that no expensive holding devices and guides are needed for mounting said radiator groups, since the protective tubes which are permanently built into the siphon can take this function. Moreover, no additional sealing problems will occur. The exchange of the radiator groups and their examination during operation are facilitated by their easy accessibility. Leakages on the holders of the protective tubes do not result in a water intake into the interior of said protective tubes, since in operation the tube acting as a siphon is under partial vacuum whereas atmospheric pressure is present in the interior of said protective tubes. For a chemical cleaning of said protective tubes, the radiator groups can remain in their operating position. Simply, the siphon is to be emptied and to be shut off. Thereafter, the cleaning fluid can be fed into the siphon and removed therefrom after termination of the cleaning process by means of a separate discharge pipe. Thus, maintenance of the installation is essentially simplified.

In a preferred embodiment of the invention, the installation is designed as follows: The siphon is provided with a steeply ascending tube section dipping into the headwater and with a subsequent gently ascending tube section; the UV irradiation apparatus is mounted into the gently ascending tube section of said siphon; and the ascending tube and a soil tube dipping into the low-water are connected by means of a rising overflow bend whose overflow edge is situated higher than the reaction chamber of the UV irradiation apparatus.

Said high-lying overflow edge ensures that the UV irradiation apparatus is moistened on its whole active radiation area. independently of any possible pressure drop in the tube. This is also true for the cleaning fluid when the apparatus is cleaned. Furthermore, the high-lying overflow edge prevents the cleaning fluid from overflowing into the low-water conduit section. This effect is still favored by the gentle ascension of the conduit section containing the UV irradiation apparatus.

Preferably, a vent valve is provided on the upper side of the overflow bend, said vent valve being connected to a lift pump for evacuating the air from the siphon. The siphon is started by the evacuation of the air. Said lift pump is also to be started occasionally when after a long time of operation too much air, which entered through leaking spots or came from the sewage, has accumulated in the overflow bend. For this purpose a sensor for monitoring the water level in the overflow bend and for controlling the operation of said lift pump may be provided for.

In order to carry out the cleaning process, the installation may comprise a shut-off device at the inlet side of the gently ascending tube section, and immediately down-stream a valve for draining this conduit section and for admitting and draining the cleaning fluid. By means of said shut-off device, the tightness of the ascending tube, and particularly that of the holders of the ascending tube, can be checked.

The siphon together with all hydraulic fittings necessary for its operation, together with the electric fittings, and together with an electric supply system for the operation of the UV irradiation apparatus may be designed as a compact modular unit. Such a modular unit can be delivered ready for use after manufacture, and can be installed and taken into operation at the place of its use without important constructional measures.

Usually, a plurality of radiator groups is needed for a sufficient disinfection of the sewage. The provision of one sole siphon for all necessary radiator groups would result in an exaggerated length of the same. This should be avoided in view of its stability and transportability. Moreover, a great overall length of the siphon results in a need for more floor space for the disinfection installation, e.g. in the direction of the drain, if the two conduit sections are arranged one after the other. In order to achieve a compact structural shape of the installation, it may be advisable to arrange the two conduit sections parallel to each other, and to arrange, at right angles to the longitudinal direction of the conduit sections, a plurality of siphons working in parallel.

It may be advantageous for the safety of operation to provide for means for automatically switching off the radiator groups. These means by way of example come into action when the lift pump is continuously on of a long time, which is an indication for a major leakage in the tube. Said means effect by way of example the closure of the shut-off device and the actuation of a seepage warning device.

PREFERRED EMBODIMENT OF THE INVENTION

Figure 1:
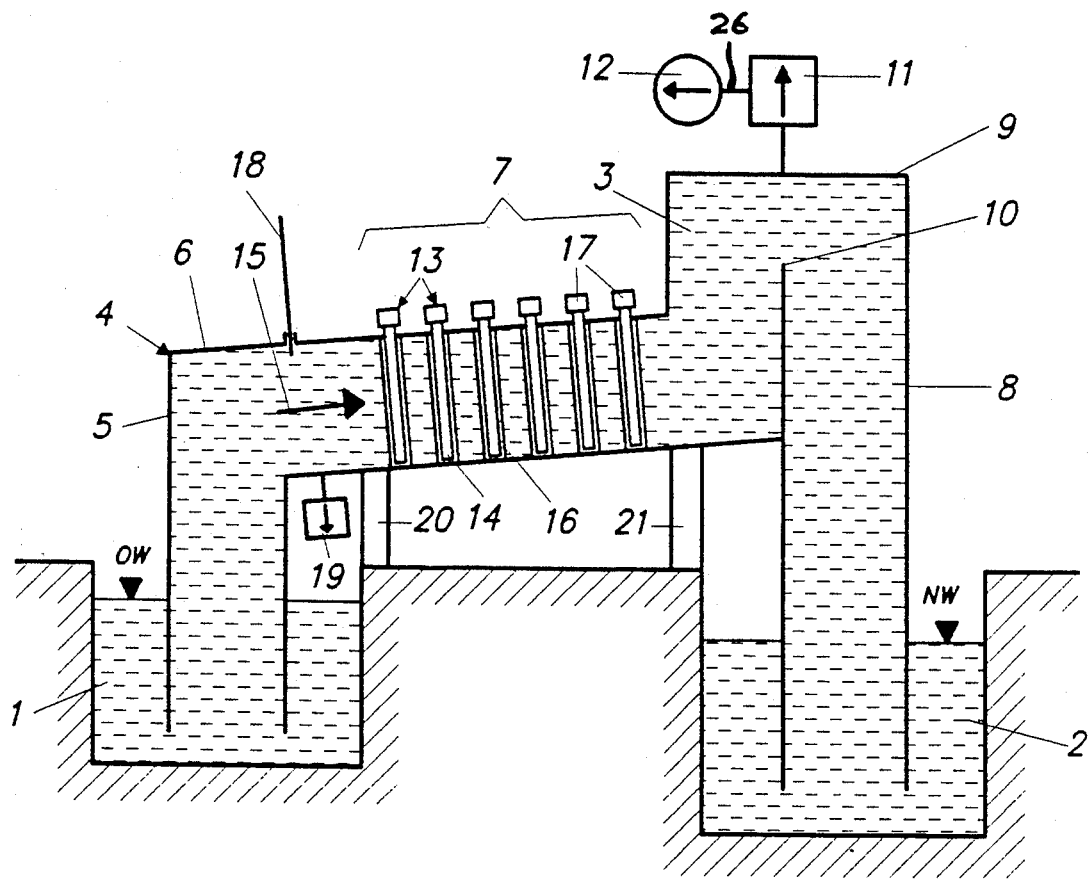
FIG. 1 is a diagrammatic sectional view of an irradiation apparatus in accordance with an embodiment of the present invention.

Now, a preferred embodiment of the present invention will be described with reference to the drawings.

The open discharge conduit, by which the clarified sewage is withdrawn form a sewage clarification plant, comprises a headwater conduit section 1 and a low-water conduit section 2 separated from the former. The two conduit sections 1 and 2, respectively, run parallel to each other and have different water levels OW (headwater) and NW (low-water), respectively. They are connected to each other by an overground tube which is designed as a siphon 3. The ascending tube 4 of said siphon 3 comprises a steeply ascending tube section 5 dipping into the headwater and a subsequent gently ascending tube section 6. The UV irradiation apparatus, as a whole referred to as 7, is built into said gently ascending tube section 6. The ascending tube 4 is connected to the soil tube 8 of said siphon 3, which is dipping into the low-water, by means of a rising overflow bend 9 whose overflow edge 10 is situated higher than the reaction chamber of the UV irradiation apparatus 7.

A vent valve 11 is provided on the upper side of the overflow bend 9, said vent valve 11 being connected by a pipe 26 to a lift pump 12. Said lift pump 12 evacuates the air from the siphon 3 in order to start the flow of the sewage from said headwater conduit section 1 to said low-water conduit section 2.

The UV irradiation apparatus 7 comprises a plurality of UV radiators 14. Preferably, said UV radiators 14 are mercury vapor discharge tubes working in the UV-C range. These UV radiators 14 are grouped into modular radiator groups 13 which are separately exchangeable. In the present example, each radiator group 13 comprises a plurality of UV radiators 14, only one of them being shown. Said UV radiators 14 are arranged in a plane which is perpendicular to the direction of sewage flow 15. Each UV radiator 14 is surrounded by a radiation pervious protective tube 16 which prevents water from accessing to the discharge tube involved and its electric contact. These protective tubes 16 are permanently built into the gently ascending tube section 6 of the ascending tube 4 by means of holders comprising a suitable sealing compound. Electric fittings 17 for operating the UV radiators 14 are arranged at the upper side of each radiator group 13.

A shut-off device, e.g. a slide valve 18, is arranged at the inlet side of the gently ascending tube section 6. Said shut-off device allows stopping the operation of the siphon 3 when the protective tubes 16 are to be cleaned. Furthermore, a valve 19 is provided for the drainage of this conduit section 6 and for the admission and drainage of the cleaning fluid, said valve 19 being arranged immediately down-stream of the slide valve 18.

The whole siphon 3, which together with the hydraulic fittings for its operation and together with the electric fittings and an electric supply system for the operation of the UV irradiation apparatus 7 may be designed as a compact modular unit, is supported e.g. by two supports 20 and 21, respectively. By dividing the soil tube into two conduit sections, positioning the sockets 20 and 21 are the sole constructional measures to be taken when installing the disinfection installation.

Figure 2:
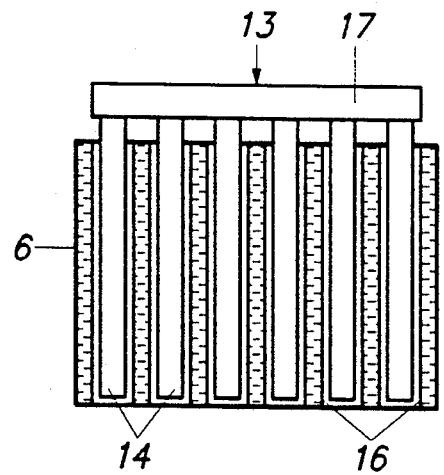
FIG. 2 is a sectional view through tube section (6) of FIG. 1.

In the embodiment shown in FIG. 2, the installation for UV irradiation according to the present invention comprises a plurality of UV radiators 14 which are grouped so as to form modular, individually replaceable radiator groups 13. The UV radiators 14 of each radiator group 13 are arranged in a plane which is perpendicular to the direction of sewage flow. Each radiator 14 is encased in a protective tube 16. The protective tubes 16 are permanently built into the gently ascending section 6 of the siphon 3 (FIG. 1). Each radiator group 13, comprising a plurality of radiators 14 and the electric fitting, 17 is removable, as a module, from the protective tubes 16 and replaceable with a new radiator group.

The overground arrangement of the UV irradiation apparatus, which is not lowered into the waste conduit but to which the sewage is fed, has the advantage that no expensive holding devices and guides are needed for mounting said radiator groups 13, since the protective tubes 16 which are permanently built into the siphon 3 can take this function. Moreover, no additional sealing problems will occur. The exchange of the radiator groups 13 and their examination during operation are facilitated by their easy accessibility. Leakages on the holders of the protective tubes 16 do not result in a water intake into the interior of the protective tubes 16, since in operation the gently ascending section 6 acting as a siphon is under partial vacuum whereas atmospheric pressure is present in the interior of said protective tubes. For a chemical cleaning of said protective tubes, the radiator groups can remain in their operating position. Simply, the siphon 3 is emptied and shut off, by slide valve 18. Thereafter, the cleaning fluid is fed into the siphon and removed therefrom after termination of the cleaning process by means of the separate discharge pipe 19. Thus, maintenance of the installation is essentially simplified.

The high-lying overflow edge 10 ensures that the UV irradiation apparatus 7 is moistened on its whole active radiation area, independently of any possible pressure drop in the siphon 3. This is also true for the cleaning fluid when the apparatus is cleaned. Furthermore, the high-lying overflow edge 10 prevents the cleaning fluid from overflowing into the low-water conduit section. This effect is still favored by the gentle ascension of the conduit section 6 containing the UV irradiation apparatus.

Figure 3:
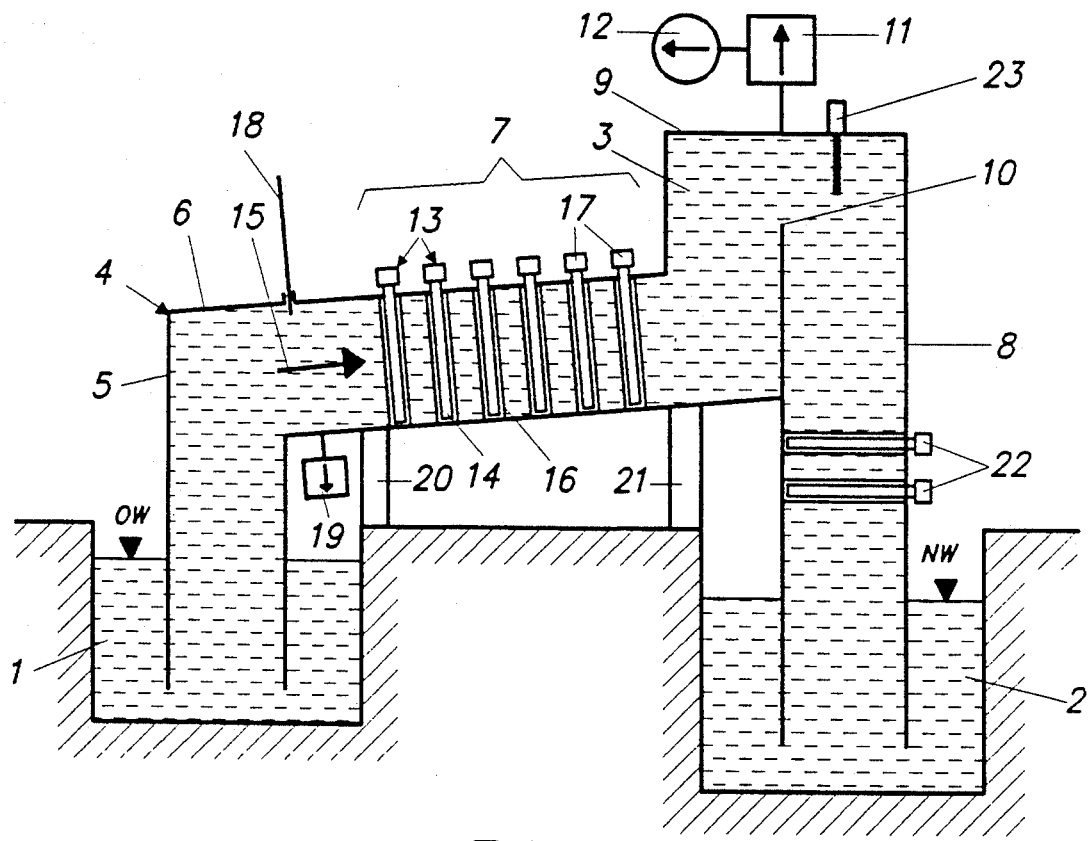
FIG. 3 is a diagrammatic sectional view similar to FIG. 1 of a further embodiment of the present invention.

An embodiment of the present invention is illustrated in FIG. 3. FIG. 3 shows a sensor 23 extending down into the overflow bend 9. Above, it was mentioned that the vent valve 11 is connected to the lift pump 12 for evacuating the air from the siphon. The siphon is started by the evacuation of air. The lift pump 12 is also started occasionally when after a long time of operation, too much air, which entered through leaky spots or came from the sewage, has accumulated in the overflow bend 9. For this purpose, the sensor 23 (FIG. 3) monitors the water level in the overflow bend and controls the operation of the lift pump 12.

Also, as shown in the embodiment of FIG. 3, the disinfection installation according to the present invention comprises a pair of the UV irradiation apparatus arranged in the ascending the tube section 6 f the siphon 3, whereas another part 22 of said UV irradiation apparatus is arranged in the soil tube 8 of said siphon.

Figure 4:
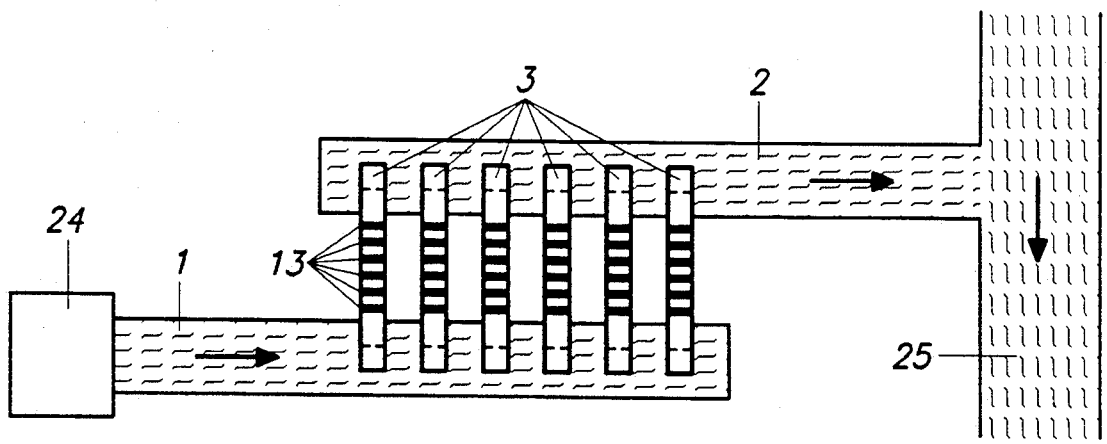
FIG. 4 is a plan view of an installation of the present invention showing several of the irradiation apparatus of FIG. 1.

Usually, a plurality of radiator groups 13 is needed for a sufficient disinfection of the sewage. The provision of one sole siphon 3 for all necessary radiator groups 13 would result in an exaggerated length of the siphon. This should be avoided in view of its stability and transportability. Moreover, a great overall length of the siphon 3 results in a need for more floor space for the disinfection installation. e.g., in the direction of the conduit section 2, if the two conduit sections 1 and 2 are arranged one after the other. In order to achieve a compact structural shape of the installation, it is advisable to arrange the two conduit sections 1 and 2 parallel to each other, as shown in FIG. 4, and to provide at right angles to the longitudinal direction of the conduit sections, a plurality of siphons 3 working in parallel. Sewage is withdrawn from a sewage clarification plant 24 into conduit section 1. The sewage flows through the parallel siphons 3 into conduit section 2 which connects with open water 25.

What is claimed is:

1. An installation designed for the disinfection of clarified sewage which is withdrawn from a sewage clarification plant by an open discharge conduit, said installation comprising:

a headwater conduit section of said open discharge conduit having a flow therein;

a low-water conduit section of said open discharge conduit, said low-water conduit section being separated from said headwater conduit section and having a flow therein;

at least one overground tube connecting said two conduit sections, said at least one overground tube being designed as a siphon; and a UV irradiation source built into said siphon for irradiating sewage within said siphon.

2. An installation according to claim 1 wherein said UV irradiation source comprises a plurality of UV radiators which are grouped to form at least one modulator radiator group, said at least one modular radiator group being replaceable as a group.

3. An installation according to claim 2 wherein said UV radiators of each modular radiator group are arranged in planes which are transverse to flow through said siphon.

4. An installation according to claim 1, wherein said two conduit sections are parallel to each other, said at least one over-ground tube comprising a plurality of UV irradiation source containing siphons arranged at right angles to the longitudinal direction of said conduit sections and parallel to each other.

5. An installation designed for the disinfection of clarified sewage which is withdrawn from a sewage clarification plant by an open discharge conduit, said installation comprising:
- a headwater conduit section of said open discharge conduit having a flow therein;
- a low-water conduit section of said open discharge conduit, said low-water conduit section being separated from said headwater conduit section and having a flow therein;
- at least one overground tube connecting said two conduit sections, said at least one overground connecting tube being designed as a siphon; and
- a UV irradiation source built into said siphon for irradiating the sewage;
- said siphon comprising:
  - an ascending tube comprising a steeply ascending section dipping into the flow in said headwater conduit section;
  - a soil tube dipping into the flow in said low-water conduit section;
  - a rising overflow bend comprising a gently ascending tube section defining a reaction chamber and an overflow edge situated higher than said reaction chamber, said rising overflow bend connecting said ascending tube and said soil tube;
  - said UV irradiation source being built into said gently ascending tube section of said ascending tube.

6. An installation according to claim 5, said overflow bend having an upper side, said installation further comprising:
- a vent valve provided at an upper portion of said overflow bend;
- a lift pump for evacuating air from said siphon; and
- a pipe connecting said vent valve to said lift pump.

7. An installation according to claim 6, said installation further comprising a sensor within said overflow bend for monitoring the water level is said overflow bend, said sensor controlling the operation of said lift pump.

8. An installation according to claim 5, said gently ascending tube section comprising an inlet side, said installation further comprising:
- a shut-off device provided at the inlet side of said gently ascending tube section of said ascending tube; and
- at least one valve for the drainage of said gently ascending tube section and for the admission and draining of a cleaning fluid, said at least one valve being arranged immediately downstream of the shut-off device.

9. An installation designed for the disinfection of clarified sewage which is withdrawn from a sewage clarification plant by an open discharge conduit, said installation comprising:
- a headwater conduit section of said open discharge conduit having a flow therein;
- a low-water conduit section of said open discharge conduit, said low-water conduit section being separated from said headwater conduit section and having a flow therein;
- at least one overground tube connecting said two conduit sections, said at least one overground connecting tube being designed as a siphon; and
- a UV irradiation source built into said siphon for irradiating the sewage;
- said irradiation source comprising a plurality of UV radiators and an electric fitting for supplying current to said UV radiators, said plurality of UV radiators and said electric fitting defining a compact modular unit.

10. An installation designed for the disinfection of clarified sewage which is withdrawn from a sewage clarification plant by an open discharge conduit, said installation comprising:
- a headwater conduit section of said open discharge conduit having a flow therein;
- a low-water conduit section of said open discharge conduit, said low-water conduit section being separated from said headwater conduit section and having a flow therein;
- at least one overground tube connecting said two conduit sections, said at least one overground connecting tube being designed as a siphon; and
- a UV irradiation source built into said siphon for irradiating the sewage;
- wherein said UV irradiation source comprises a plurality of UV radiators which are grouped to form a modular radiator group;
- said installation further comprising radiation-previous protective tubes housing each UV radiator, said radiation-pervious protective tubes being permanently built into said siphon.

11. An installation designed for the disinfection of clarified sewage which is withdrawn from a sewage clarification plant by an open discharge conduit, said installation comprising:
- a headwater conduit section of said open discharge conduit having a flow therein;
- a low-water conduit section of said open discharge conduit, said low-water conduit section being separated from said headwater conduit section and having a flow therein;
- at least one overground tube connecting said two conduit sections, said at least one overground connecting tube being designed as a siphon; and
- a UV irradiation source built into said siphon for irradiating the sewage;
- wherein said siphon comprises an ascending tube section and a soil tube section downstream of said ascending tube section, a part of said UV irradiation source being arranged in the ascending tube section and a part of the UV irradiation source being arranged in the soil tube section.

* * * * *

UNITED STATES PATENT AND TRADEMARK OFFICE
CERTIFICATE OF CORRECTION

PATENT NO. : 5,151,174
DATED : September 29, 1992
INVENTOR(S) : Rudolf Weismann

It is certified that error appears in the above-identified patent and that said Letters Patent is hereby corrected as shown below:

Column 7, Line 1, Claim 2, change "modulator" to --modular--.

Column 8, Lines 41 and 42, Claim 10, change "previous" to --pervious--.

Signed and Sealed this

Twelfth Day of October, 1993

Attest:

BRUCE LEHMAN

*Attesting Officer*    *Commissioner of Patents and Trademarks*